United States Patent Office 2,835,611
Patented May 20, 1958

2,835,611
PRODUCTION OF SUGARS FROM WOOD PRODUCTS

Francis H. Snyder, Newtown, Conn.

No Drawing. Application June 28, 1956
Serial No. 594,356

5 Claims. (Cl. 127—37)

This invention relates to the production of sugars and related compounds from woody materials.

The digestion of lignocellulosic material at elevated temperatures and pressures, in the presence of various electrolyte substances, has been the subject of extensive research. Generally, whether by accident or design, the resulting products have been primarily of two characters. In some cases, the cellulosic fibers have been preserved along with the partial cleavage of the lignin-cellulosic bond so that the lignin appears as a plastic mass. On the other hand, the conditions have been so drastic that all of the fiber content of the wood has been degraded to a plastic mass designated as humin. Although it is known that cellulose can be converted into sugar substances by appropriate digestion, the direct conversion of wood to sugar has seemed to be associated with too many side reactions to have been an attractive subject of research.

The present process is designed to establish an easily controllable set of conditions that will consistently provide high yields of sugars directly from wood in spite of the wide variation in the initial composition of the wood, due to the differing species.

The invention contemplates that the woody material will be initially impregnated with catalytic quantities of an alkaline or buffer reagent and then subjected in the substantial absence of liquid to elevated temperatures and pressures for a comparatively short period of time. The pressures employed are in the range of 600 to 1250 p. s. i., the temperatures being those that approximately correspond to the said pressures under conditions of saturated steam, that is, about 250 to 300° C.

The amount of catalyst employed may be stated in several ways. In the case of hard woods such as oak and maple, the amount of alkali should be approximately ⅓ to ½ of the amount necessary to neutralize the acetic acid produced by the degradation of the wood. It is desired that the acidity of the reaction mass shall end up in the comparatively narrow pH range of 3.1 to 3.4. If the pH extends to acidity of the order of pH 2.7, the yield of sugars will be cut down by conversion of a portion of them to furanes while, a pH in the range of 4.4 and higher will result in incomplete conversion of the cellulose. The alkali employed may be any of the alkali or alkali earth metals including ammonium or mixtures thereof. An economical reagent is made up of sodium hydroxide and calcium hydroxide in ratios of from 1 to 2 to 1 to 4. Typical quantities used are from 10 to 40 pounds of sodium hydroxide per ton of dry wood substance. The advantage of using ammonium as the alkali, comes from its ease of application in the form of ammonia gas, requiring no drainage of excess liquid reagent.

In place of the alkali, there may be used such buffer-type salts as sodium acetate. Salts of moderately weak acids such as phosphoric and boric may be used although some may be excluded if their presence in the reaction product would adversely affect its future use. Sodium sulphate is an example of a salt that must be excluded because it would result in too acid a reaction product such as about pH 2.7.

The time of reaction varies from about 60 seconds to 5 minutes according to pressure employed and the amount of alkali. Very short reaction times are indicated at high pressures while the effect of larger amounts of alkali is to prolong the reaction time.

In the process, approximately 30 percent of the 5-carbon atom sugars are converted into furfural which may be recovered from the liquid reaction product by distillation. A yield of about 150 pounds acetic acid per ton of wood can be expected, according to the species of wood treated. Small amounts of formic acid may be expected but significant percentages are generally associated with excessively drastic reaction conditions. Substantially all of the lignin content of the wood is recovered in highly depolymerized, low molecular weight form. Such material has many commercial uses, as for example, as an extending agent for phenolic resins.

The liquid reaction product contains approximately 30 percent glucose and xylose. In addition, the liquid contains a large amount of relatively low polysaccharides, mostly disaccharides and trisaccharides. These can be converted to the monosaccharides by heating lightly with acid if it is desirable to obtain this kind of product. By such treatment yields between 80 and 90 percent recovery of the theoretical amount of xylose and glucose can be obtained consistently. For some purposes, such as the production of furanes from the liquid reaction mixture, it will not be necessary to convert the polysaccharides into monosaccharides.

Following are examples of the practical application of my process:

Example 1

Green slivers of red oak veneer waste was soaked overnight in a 2 percent solution of NaOH to take up approximately 15 pounds per ton D. W. S. A quantity of about 15 pounds was charged to a hot reaction chamber. Steam was admitted at such a rate as to reach 1000 pounds pressure in 20 seconds and held at this pressure for 150 seconds. At the close of this time, the entire mass was discharged by means of a quick-opening valve into a body of hot water. This process was repeated with seven successive lots of wood, until a thick but pumpable slurry was formed. The lignin was filtered off and washed with a small amount of water, the wash water being employed as the suspending agent for the next series of high pressure reaction products. The resulting solution was suitable for direct conversion to furanes.

Example 2

Oak chips, approximately one half inch square by one eighth inch thick, were soaked thoroughly in water and drained. A quantity of the chips were placed in a pressure vessel and ammonia gas led into the vessel at a sufficiently slow rate so that there was no trace of ammonia in the effluent gas. When it was calculated that .85 percent gas on a dry weight basis had been taken up, the impregnated chips were transferred to the pressure vessel used in Example 1 and subjected to steam at 1000 pounds for 170 seconds.

After removing the lignin from the reaction product, the liquid was cautiously heated with a small amount of hydrochloric acid to produce a fermentable product, upon neutralization.

The process disclosed herein is characterized by its relative simplicity and its application to common raw materials, thus affording an unusually low operating cost.

I claim:
1. A process for the production of sugars from woody materials comprising impregnating the wood with a material of the class consisting of the hydroxides of the alkali and alkali-earth metals and ammonium and the weak acid salts thereof in an amount sufficient to obtain a pH of 3.1 to 3.4 in the subsequent reaction product, subjecting the drained wood, in the substantial absence of liquid, to the action of steam at pressures between 600 and 1250 p. s. i. for a time of 5 minutes to 1 minute and abruptly stopping the reaction.

2. The process of claim 1 where the reaction product is filtered to recover lignin.

3. The process of claim 1 wherein the alkali used is a mixture of NaOH and $Ca(OH)_2$ employed in the ratio of 1:2 to 1:4.

4. The process of claim 1 wherein the alkali used is ammonia.

5. The process of claim 1 wherein the alkali used is NaOH.

References Cited in the file of this patent
UNITED STATES PATENTS

| | | |
|---|---|---|
| 1,428,217 | Classen | Sept. 5, 1922 |
| 1,855,464 | Babcock | Apr. 26, 1932 |
| 2,080,078 | Mason et al. | May 11, 1937 |
| 2,234,188 | Morgan et al. | Mar. 11, 1941 |
| 2,292,389 | Meiler | Aug. 11, 1942 |
| 2,759,856 | Saums et al. | Aug. 21, 1956 |